(12) United States Patent
Ma et al.

(10) Patent No.: US 10,390,194 B2
(45) Date of Patent: Aug. 20, 2019

(54) METHOD AND DEVICE FOR MANAGING VEHICLES IN INTERNET OF VEHICLES

(71) Applicant: ZTE CORPORATION, Shenzhen, Guangdong (CN)

(72) Inventors: Zijiang Ma, Guangdong (CN); Hui Xu, Guangdong (CN); Zhifeng Ma, Guangdong (CN); Chen Lu, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/739,397

(22) PCT Filed: Nov. 18, 2015

(86) PCT No.: PCT/CN2015/094950
§ 371 (c)(1),
(2) Date: Dec. 22, 2017

(87) PCT Pub. No.: WO2016/206291
PCT Pub. Date: Dec. 29, 2016

(65) Prior Publication Data
US 2018/0359619 A1    Dec. 13, 2018

(30) Foreign Application Priority Data

Jun. 26, 2015    (CN) .......................... 2015 1 0366072

(51) Int. Cl.
*H04W 4/00*    (2018.01)
*H04W 4/44*    (2018.01)
(Continued)

(52) U.S. Cl.
CPC ............... *H04W 4/44* (2018.02); *H04W 4/08* (2013.01); *H04W 4/46* (2018.02); *H04W 84/18* (2013.01); *H04W 84/20* (2013.01); *H04W 84/005* (2013.01)

(58) Field of Classification Search
CPC ........... H04W 4/44; H04W 4/46; H04W 4/08; H04W 84/18
(Continued)

(56) References Cited

U.S. PATENT DOCUMENTS 9,723,457 B2    8/2017 Brahmi et al.
2009/0285197 A1*  11/2009 Chen ....................... H04L 45/00
                                                      370/351
(Continued)

FOREIGN PATENT DOCUMENTS

CN    101075877 A    11/2007
CN    101207572 A    6/2008
(Continued)

OTHER PUBLICATIONS

International Search Report dated Mar. 15, 2016 for International Application No. PCT/CN2015/094950, 5 pages.
(Continued)

*Primary Examiner* — Khoi H Tran
*Assistant Examiner* — B M M Hannan
(74) *Attorney, Agent, or Firm* — Knobbe Martens Olson & Bear LLP

(57) ABSTRACT

A method and device for managing vehicles in Internet of Vehicles (IOV) are provided. The method includes: acquiring, by a leading vehicle in the IOV, management authority from a network side equipment, the management authority is authority of the leading vehicle for managing a vehicle group to which the leading vehicle belongs, and the vehicle group includes a plurality of vehicles; managing, by the
(Continued)

leading vehicle, the vehicle group to which the leading vehicle belongs according to the management authority. The present disclosure solves the problem in the related art that the network side equipment fails to allocate and release resources for vehicles in the IOV timely, thereby improving the efficiency in managing vehicles in the IOV.

17 Claims, 6 Drawing Sheets

(51) Int. Cl.
  *H04W 84/18* (2009.01)
  *H04W 84/20* (2009.01)
  *H04W 4/46* (2018.01)
  *H04W 4/08* (2009.01)
  *H04W 84/00* (2009.01)

(58) Field of Classification Search
  USPC .................................................. 455/422.1
  See application file for complete search history.

(56) References Cited

U.S. PATENT DOCUMENTS

| | | |
|---|---|---|
| 2010/0033347 A1 | 2/2010 | Hayashi |
| 2010/0256835 A1 | 10/2010 | Mudalige |
| 2010/0256836 A1 | 10/2010 | Mudalige |
| 2010/0256852 A1 | 10/2010 | Mudalige |
| 2013/0029716 A1 | 1/2013 | Lee |
| 2013/0030606 A1* | 1/2013 | Mudalige ................. G08G 1/22 701/2 |
| 2013/0039357 A1 | 2/2013 | Akita |
| 2014/0302774 A1* | 10/2014 | Burke .................... H04H 20/57 455/3.05 |
| 2015/0254987 A1* | 9/2015 | Altintas ................. G01C 21/34 701/409 |
| 2016/0212596 A1 | 7/2016 | Brahmi et al. |
| 2016/0232791 A1* | 8/2016 | Tosa ...................... B60W 30/14 |
| 2016/0267796 A1* | 9/2016 | Hiroma .................... G08G 1/22 |
| 2016/0277513 A1* | 9/2016 | Kim ........................ H04L 67/18 |

FOREIGN PATENT DOCUMENTS

| | | |
|---|---|---|
| CN | 103873485 A | 6/2014 |
| WO | 2015032436 A1 | 3/2015 |

OTHER PUBLICATIONS

Written Opinion of the International Searching Authority dated Mar. 15, 2016 for International Application No. PCT/CN2015/094950, 3 pages.

European Search Report dated Nov. 2, 2018 for Application No. EP 15 89 6175, 10 pages.

* cited by examiner

METHOD AND DEVICE FOR MANAGING VEHICLES IN INTERNET OF VEHICLES

CROSS REFERENCE TO RELATED APPLICATIONS

This application is the U.S. National Phase Application under 35 U.S.C. § 371 of International Application No. PCT/CN2015/094950 filed on Nov. 18, 2015, designating the U.S. and published as WO 2016/206291 A1 on Dec. 29, 2016, which claims the benefit of Chinese Patent Application No. 201510366072.2, filed Jun. 26, 2015, both of which are hereby incorporated by reference in their entirety.

TECHNICAL FIELD

The present disclosure relates to the field of communication technology, and in particular to a method and device for managing vehicles in internet of vehicles (IOV).

BACKGROUND

With the development of wireless multimedia services, requirements on higher data rate and better user experience is growing, thereby requiring the traditional cellular network to have greater capability and coverage. On the other hand, in scenarios such as public security, social network, data sharing at short distance, local advertisement, requirements for Proximity Services (PS), through which a person may know and communicate with neighboring people or things, gradually increase. The traditional cellular network centers on a base station, and is significantly limited in support for high data rate and proximity services. In such a background, Device-to-Device (D2D) technology representing a new development direction of the technology of communications emerges. The application of the D2D technology may reduce the burden of the cellular network and power consumption of a user equipment, enhance data rate and improve the robustness of the network infrastructure, so as to satisfy the requirements of high data rate and proximity services described above.

The D2D technology may operate in an authorized or unauthorized frequency band, and allows a plurality of user equipments (UE) supporting D2D function (i.e., D2D UE) to discover/communicate directly with or without the network infrastructure.

FIG. 1 is a schematic diagram illustrating application scenarios of the D2D technology in the related art. As illustrated in FIG. 1, the D2D technology is mainly implemented in three types of patterns described below. In pattern 1, a data interaction is performed between UE 1 and UE 2 under the coverage of a cellular network, and the user plane data does not pass through the network infrastructure. In pattern 2, the UE in an area with poor coverage/without coverage relays the transmission. In this case, UE 4 with poor signal quality is allowed to communicate with a network via UE 3 covered by the network, thereby facilitating the Operator to expand coverage and increase capability. In pattern 3, UEs can communicate with each other directly when earthquake or emergency occurs and the cellular network malfunctions. In this case, both of the control plane data and user plane data among UE 5, UE 6 and UE 7 do not pass through the network infrastructure, and the data communication is single hopping or multi-hopping.

In addition, the D2D technology in the related art includes D2D discovery technology and D2D communication technology. The D2D discovery technology refers to the technology for judging/determining whether a first UE is adjacent to a second UE. A user equipment of the D2D can discover another user equipment of the D2D by transmitting or receiving a discovery signal/information. The D2D communication technology refers to the technology through which the user equipments of the D2D may communicate part or all of the communication data directly without using the network infrastructure.

Based on the characteristics and advantages of the D2D technology described above, it is proposed in the prior art to implement applications of Internet of Vehicle (IOV) using wireless cellular communication and D2D technology. The IOV supports the following scenarios for communication: instant messaging and vehicle warning. Vehicle warning may include collision warning, lane-change warning, etc. However, in this scenario, the requirements on delay are very strict, and the existing D2D technology cannot meet the requirements.

During the communication through the IOV, the communication between vehicles, which is also called as Vehicle to Vehicle (V2V) communication, needs to satisfy the requirements of low delay and high reliability in many scenarios. For example, if a distance between two vehicles is too short (that is, vehicle A is too close to vehicle B), it is required to pay attention to driving safety. FIG. 2 is a schematic diagram illustrating vehicular traffic in the related art. As shown in FIG. 2, vehicle B will fail to quickly prevent collision with vehicle A due to a relay in obtaining information about the location/speed of vehicle A if the information about the location/speed of vehicle A is reported to the network by vehicle A and then sent to vehicle B by a network-side equipment.

FIG. 3 is a schematic diagram illustrating communication through the IOV in the related art. As shown in FIG. 3, during the communication through the IOV, the communication between the vehicle and the network is called as Vehicle to Infrastructure (V2I) communication. The V2I communication is also called as V2R communication, where R refers to a Road Side Unit (RSU). The V2I communication and V2R communication refer to the communication between a vehicle and the network.

It is more appropriate to adopt the V2V communication in application scenarios related to vehicle safety. Further, the V2V communication may adopt the above D2D technology defined by the 3rd Generation Partnership Project (3GPP). Each vehicle supporting the V2V communication needs to obtain a resource necessary for communication (e.g., physical resources such as frequency and time slot of communication) to implement the V2V communication. In the case that the V2V communication adopts the D2D technology defined by the 3GPP, resources necessary for the V2V communication may be obtained through a contention mechanism. For example, a vehicle which obtains the resource first may use the resource first. However, through such mechanism, resource congestion and collision will occur if there are a plenty of vehicles in an area. For example, there is a resource block that has been allocated in advance, and a plurality of vehicles use a same resource including frequency resource and slot resource. As a result, none of these vehicles is able to use the resource, and information of these vehicles cannot be transmitted. Therefore, in the V2V communication, collision may easily occur if the vehicles obtain resources in the resource pool through a contention mechanism, resulting in that information of these vehicles cannot be sent out timely.

In other words, in the case that there are a plenty of vehicles in one area, the network may allocate and schedule resources for each of the vehicles to avoid the congestion caused by the resource contention among the vehicles. In this way, the vehicles will not simultaneously use the same resource in the V2V communication, so that information of each vehicle is sent out timely. That is to say, the V2V communication is required in the IOV application scenario related to vehicle safety, and delay or communication failure of the IOV, caused by resource collision during the V2V communication of the vehicles in the area with crowded vehicles, is required to be avoided.

In view of the above, the problem of the related art is that, when network side equipment allocates resources to a plenty of vehicles in an area crowded of vehicles, since the high-speed movement of the vehicles leads to handover between cells, the network fails to allocate and release resources for the vehicles timely.

At present, there is no effective solution proposed with respect to the problem described above.

SUMMARY

The present disclosure aims to provide a method and device for managing vehicles in IOV, so as to at least solve the problem in related art that network side equipment fails to allocate and release resources for vehicles in IOV timely.

According to an aspect of the present disclosure, a method for managing vehicles in the IOV is provided, which includes: acquiring, by a leading vehicle in the IOV, management authority from a network side equipment, where the management authority is authority of the leading vehicle for managing a vehicle group to which the leading vehicle belongs, and the vehicle group comprises a plurality of vehicles; managing, by the leading vehicle, the vehicle group to which the leading vehicle belongs according to the management authority.

Optionally, the acquiring, by a leading vehicle in the IOV, management authority from a network side equipment includes: transmitting, by the leading vehicle, a request message for applying for the management authority to the network side equipment; receiving, by the leading vehicle, a response message transmitted from the network side equipment in response to the request message. The response message is used for indicating that the management authority is obtained by the leading vehicle.

Optionally, the request message is carried with at least one of: identifiers of all the vehicles in the vehicle group to which the leading vehicle belongs, and communication resources.

Optionally, the managing, by the leading vehicle, the vehicle group to which the leading vehicle belongs according to the management authority includes: transmitting, by the leading vehicle, a first notification message to the vehicles of the vehicle group to which the leading vehicle belongs other than the leading vehicle, where the first notification message is used for notifying the vehicles of the vehicle group other than the leading vehicle that the management authority is obtained by the leading vehicle; performing, by the leading vehicle, a management operation on the vehicle group after receiving a message which is transmitted from the vehicles of the vehicle group other than the leading vehicle in response to the first notification message and used for acknowledging the management authority.

Optionally, the management operation on the vehicles of the vehicle group includes at least one of: communication resource management, mobility management and connection management.

Optionally, after the managing, by the leading vehicle, the vehicle group to which the leading vehicle belongs according to the management authority, the method further includes: reporting, by the leading vehicle, status information about the vehicle group to which the leading vehicle belongs to the network side equipment.

Optionally, after the managing, by the leading vehicle, the vehicle group to which the leading vehicle belongs according to the management authority, the method further includes: when the leading vehicle decides to lose the management authority or leave the group, transmitting, by the leading vehicle, a second notification message indicating that the leading vehicle gives up the authority for managing the vehicle group to the network side equipment; receiving, by the leading vehicle, a response message transmitted from the network side equipment in response to the second notification message, the response message is used for indicating that the leading vehicle has lost the management authority.

Optionally, information interaction between the leading vehicle and vehicles of the vehicle group other than the leading vehicle and/or information interaction between the leading vehicle and the network side equipment is performed in at least one of the following manners: Point-to-Point (PTP) communication, Point-to-Multipoint (PTM) communication.

Optionally, the network side equipment comprises at least one of: an evolved node B (eNB), a Relay, a Radio Side Unit (RSU).

According to another aspect of the present disclosure, a method for managing vehicles in the IOV is provided, which includes: granting, by a network side equipment, management authority to a leading vehicle in the IOV, where the management authority is authority of the leading vehicle for managing a vehicle group to which the leading vehicle belongs, and the vehicle group includes a plurality of vehicles.

Optionally, the granting, by a network side equipment, management authority to a leading vehicle in the IOV includes: receiving, by the network side equipment, a request message for applying for the management authority transmitted from the leading vehicle; transmitting, by the network side equipment, a response message to the leading vehicle in response to the request message. The response message is used for indicating that the management authority is granted to the leading vehicle.

Optionally, the request message is carried with at least one of: identifiers of vehicles in the vehicle group to which the leading vehicle belongs, and communication resources.

Optionally, after the granting, by a network side equipment, management authority to a leading vehicle in the IOV, the method further includes: receiving, by the network side equipment, status information about the vehicle group to which the leading vehicle belongs reported by the leading vehicle.

Optionally, after the granting, by a network side equipment, management authority to a leading vehicle in the IOV, the method further includes: when the leading vehicle decides to lose the management authority or leave the group, receiving, by the network side equipment, a second notification message indicating that the leading vehicle gives up the authority for managing the vehicle group transmitted from the network side equipment; transmitting, by the network side equipment, a response message to the leading vehicle in response to the second notification message. The response message is used for indicating that the leading vehicle has lost the management authority.

Optionally, the network side equipment comprises at least one of: an evolved Node B (eNB), a Relay, a Radio Side Unit (RSU).

According to a yet another aspect of the present disclosure, a device for managing vehicles in the IOV is provided and applied to a leading vehicle of the IOV, which includes: an acquisition module configured to acquire management authority from a network side equipment, where the management authority is authority of the leading vehicle for managing a vehicle group to which the leading vehicle belongs, and the vehicle group includes a plurality of vehicles; a management module configured to manage the vehicle group to which the leading vehicle belongs according to the management authority.

Optionally, the acquisition module includes: a first transmission unit configured to transmit a request message for applying for the management authority to the network side equipment; a first reception unit configured to receive a response message transmitted the network side equipment in response to the request message. The response message is used for indicating that the management authority is obtained by the leading vehicle.

Optionally, the request message is carried with at least one of: identifiers of all the vehicles in the vehicle group to which the leading vehicle belongs, and communication resources.

Optionally, the management module includes: a second transmission unit configured to transmit a notification message to vehicles of the vehicle group, to which the leading vehicle belongs, other than the leading vehicle, where the notification message is used for notifying vehicles of the vehicle group other than the leading vehicle that the management authority is obtained by the leading vehicle; and a management unit configured to perform a management operation on the vehicles of the vehicle group after the leading vehicle receives a message for acknowledging the management authority transmitted from the vehicles of the vehicle group other than the leading vehicle.

According to a yet another aspect of the present disclosure, a device for managing vehicles in the IOV is provided and applied to a network side equipment, which includes: an authorization module configured to grant management authority to a leading vehicle in the IOV. The management authority is authority of the leading vehicle for managing a vehicle group to which the leading vehicle belongs, and the vehicle group includes a plurality of vehicles.

Optionally, the authorization module includes: a second reception unit configured to receive a request message for applying for the management authority transmitted from the leading vehicle; and a third transmission unit configured to transmit a response message to the leading vehicle in response to the request message. The response message is used for indicating that the management authority is granted to the leading vehicle.

In embodiments of the present disclosure, vehicles in the IOV are grouped and the leading vehicle of a vehicle group acquires authority for managing the vehicle group to which the leading vehicle belongs from a network side equipment, which enables the vehicles in the vehicle group to be managed. The embodiments of the disclosure no longer need the network side equipment to manage the vehicles in the IOV respectively, and it is only required that one vehicle in the vehicle group obtains the management authority and becomes the leading vehicle to manage the vehicles in the vehicle group. Therefore, the following problem in related art is solved, thereby improving the efficiency in managing vehicles in the IOV: the network side equipment fails to allocate and release resources for vehicles in the IOV timely.

BRIEF DESCRIPTION OF DRAWINGS

The accompanying drawings are described herein to provide a further understanding of the present disclosure and constitute a part of the present application. The exemplary embodiments of the present disclosure and their descriptions explain the present disclosure. Among the accompany drawings.

DETAILED DESCRIPTION

Figure 1:
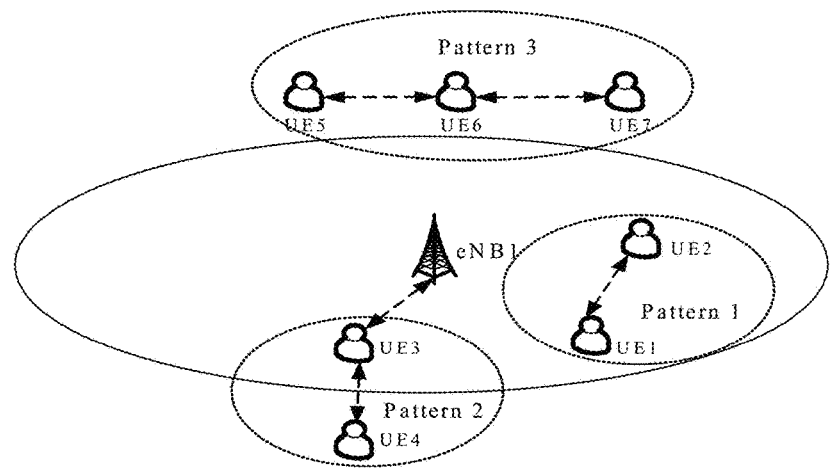
FIG. 1 is a schematic diagram of an application scenario of D2D technology in the related art.
Figure 2:
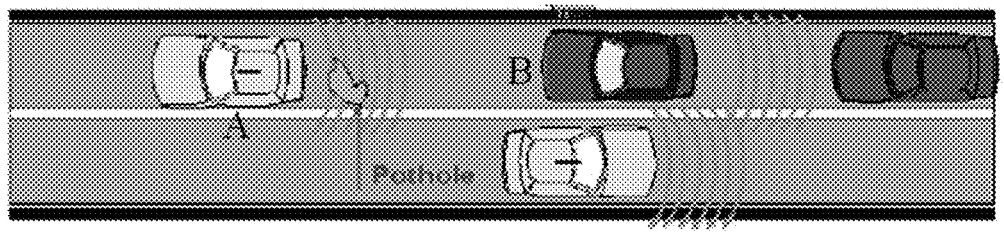
FIG. 2 is a schematic diagram of traffic of vehicles in the related art.
Figure 3:
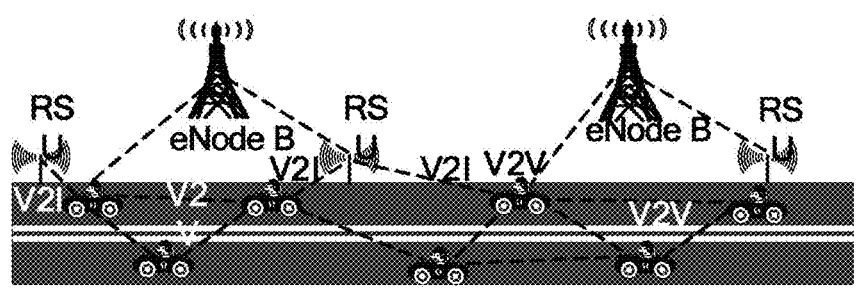
FIG. 3 is a schematic diagram of the IOV in the related art.

It should be noted that embodiments of the present application and features thereof may be combined with each other. Embodiments of the present invention will be described below with reference to the accompanying drawings.

The background of the embodiments of the present disclosure is described below. In the related art, based on collision warning systems communicated with each other, a real-time information interaction between vehicles or between the vehicle and the infrastructure at the road side is implemented though advanced wireless cellular communication technology, so as to inform each other of current state and information about road environment, cooperate to sense dangers on road and provide various collision warning information to avoid road traffic accidents. The current state includes the location, speed, acceleration of a vehicle and vehicle routing and so on. However, in the related art, the V2V communication is adopted in application scenarios related to vehicle safety, and the V2V communication may adopt the D2D technology defined by the 3GPP. Each vehicle supporting the V2V communication needs to obtain a resource necessary for communication to implement the V2V communication. In the case that the V2V communication adopts the D2D technology, resources necessary for the V2V communication may be obtained through a contention mechanism. For example, a vehicle which obtains the resource first may use the resource first. However, through such mechanism, resource congestion and collision will occur if there are a plenty of vehicles in an area. Therefore, in the V2V communication, collision may easily occur if the vehicles obtain resources in the resource pool through a contention mechanism, resulting in that information of these vehicles cannot be sent out timely.

The present embodiment provides a method for managing vehicles in the IOV. According to the management method of the present embodiment, vehicles are management in groups to form a vehicle group, and the vehicle group has one leading vehicle. The leading vehicle establishes communication with a network side equipment. Through the information interaction between the leading vehicle and the network side equipment, the network side equipment may grant the control right over the vehicle group to the leading vehicle or revoke the control right over the vehicle group from the leading vehicle. In other words, according to the method of the present embodiment, the network side equipment notifies the leading vehicle to obtain/release the control right over the vehicle group, meanwhile the network releases/obtains management authority of the vehicle group. Then, the leading vehicle takes over/releases the management authority of the vehicle group.

Moreover, the leading vehicle takes over the management authority of the vehicle group, that is to say, the leading vehicle takes over the control related to the IOV, such as vehicle traffic safety, vehicle traffic navigation, vehicle traffic information interaction, and the leading vehicle is not required to take over all the management authorities of the vehicle group. For example, as for a vehicle in the vehicle group, the communication related to the IOV is controlled by the leading vehicle, while the communication irrelevant to the IOV (e.g., a call to family or friends) is controlled by the network side. Besides, the network side equipment mentioned in the present embodiment is a network side logic unit such as Evolved Node B (eNB), Relay, Road Side Unit (RSU). The present disclosure will be described in detail in combination with accompanying drawings and embodiments of the present disclosure.

Figure 4:
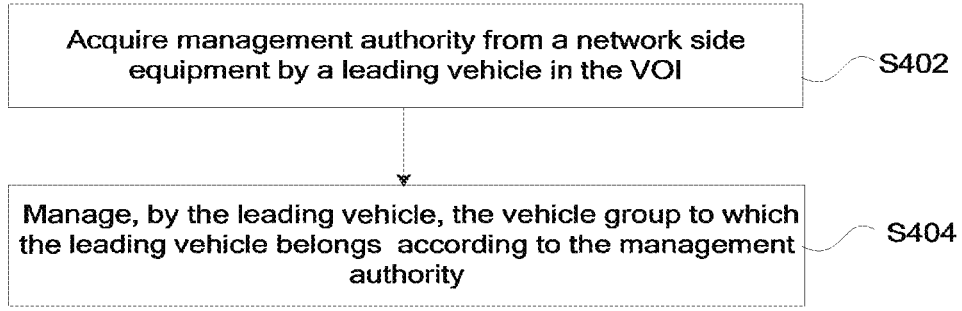
FIG. 4 is a first flowchart of a method for managing vehicles in the IOV according to an embodiment of the present disclosure.

FIG. 4 is a first flowchart of a method for managing vehicles in the IOV according to an embodiment of the present disclosure. As illustrated in FIG. 4, the method includes steps described below.

In step S402, a leading vehicle in the VOI acquires management authority from a network side equipment.

The management authority is an authority of the leading vehicle for managing a vehicle group to which the leading vehicle belongs, and each vehicle group includes a plurality of vehicles.

In step S404, the leading vehicle manages the vehicle group to which the leading vehicle belongs according to the management authority.

Through steps S402 to S404 described above in the present embodiment, vehicles in the IOV are managed in form of the vehicle group, and the leading vehicle of the vehicle group acquires authority for managing the vehicle group to which the leading vehicle belongs from network side equipment, so that the leading vehicle performs a suitable management. As can be seen, in the present embodiment, only one vehicle in the vehicle group is required to acquire the management authority to become a leading vehicle and manage the vehicles in the vehicle group, while the network side equipment is not required to manage each vehicle in the IOV anymore. Therefore, the problem that the network side equipment fails to allocate and release resources for vehicles in the IOV timely in the related art is solved, thereby improving the efficiency in managing vehicles in the IOV.

In an optional implementation of the present embodiment, step S402 of the present embodiment may be implemented in a manner described below.

In step S11, the leading vehicle transmits a request message for applying for the management authority to the network side equipment.

In step S12, the leading vehicle receives a response message sent by the network side equipment in response to the request message. The response message indicates that the management authority is acquired by the leading vehicle.

One application scenario of steps S11 and S12 described above in the present embodiment may be as follows: a dedicated point-to-point connection, such as Radio Resource Control connection (RRC), is established between the leading vehicle and the network side equipment; the leading vehicle transmits the request message for applying for the management authority to the network side equipment; the network side equipment notifies the leading vehicle that the leading vehicle has obtained the management authority.

In addition, information carried by the request message in steps S11 and S12 described above includes at least one of: communication resources and identifiers of vehicles in the vehicle group to which the leading vehicle belongs. Preferably, the communication resources are IOV communication resources including V2V communication resources and V2I communication resources in the present embodiment. In addition, the communication resources described below in the present embodiment may be V2V communication resources or V2I communication resources of IOV communication resources, which will not be described again.

In another optional implementation of the present embodiment, step S404 described above may be implemented in a manner described below.

In step S21, the leading vehicle transmits a first notification message to members of the vehicle group, to which the leading vehicle belongs, other than the leading vehicle. The first notification message is used for notifying other members of the leading vehicle that the leading vehicle has obtained the management authority.

Similarly, after obtaining the management authority, the leading vehicle may also notify other members of the vehicle group when it loses the management authority.

In step S22, upon receiving a message for acknowledging the management authority from members of the vehicle group, the leading vehicle performs a management operation on the members of the vehicle group. The management operation on the members of the vehicle group includes at least one of: communication resource management, mobility management and connection management.

It is noted that, in an optional implementation of the embodiment, either all of the members of the vehicle group or a part of the members of the vehicle group transmit the message for acknowledging the management authority in step S22 as long as the part of the members meet a preset threshold (for example, exceeding ½ or ⅔ of all of the members of the vehicle group), which may be set according to specific situations.

In an optional implementation of the present embodiment, the communication resource management may include communication resource allocation, communication resource scheduling and communication resource release. The mobility management may include measurement of the distance between members of the vehicle group or speed thereof and handover between cells serving the vehicle group. The connection management may include connection establishment and connection release between members of the vehicle group. It is noted that the management operations described above are merely illustrative, and not intended to limit the present disclosure.

As for the manner in which the leading vehicle performs the management operation in steps S21 and S22 described above, an application scenario in the present embodiment is described below.

(1) The leading vehicle allocates resources to the members of the vehicle group. First, a member of the vehicle group applies to the leading vehicle for the V2V communication resource including frequency point, time slot, service time, etc. Then, the leading vehicle agrees or refuses to allocate the V2V communication resource to the member of the vehicle group. Finally, the member of the vehicle group transmits an acknowledgement message to the leading vehicle.

(2) The leading vehicle revokes the resource previously allocated. First, the leading vehicle transmits a request message for revoking the resource previously allocated to a member of the vehicle group. Then, the member of the vehicle group transmits an acknowledgement message to the leading vehicle. Finally, the member of the vehicle group stop using the resource previously allocated.

After the leading vehicle manages the vehicle group to which the leading vehicle belongs according to the management authority, the method of the present embodiment may further include: reporting, by the leading vehicle, status information about the vehicle group to which the leading vehicle belongs to the network side equipment. The status information may include: a traveling direction of the vehicle group, average traveling speed of the entire vehicle group, traveling speed of each member of the vehicle group, distance between members of the vehicle group and indication information for managing vehicles in the vehicle group. The status information about the vehicle group is reported by the leading vehicle so that reporting status information with respect to each measurement under coverage of the network respectively is avoided. It is benefit for unified management of vehicles through reporting status information of the vehicles in the IOV by the leading vehicle. To be sure, the status information is not limited to that described above and can be adjusted according to actual situation. Similarly, the status information described below in embodiments of the present disclosure is not limited to that described above and can be adjusted according to actual situation.

After the leading vehicle manages the vehicle group to which the leading vehicle belongs according to the management authority, the method of the present embodiment further includes: when the leading vehicle decides to give up the management authority or leave the vehicle group, transmitting, by the leading vehicle, a second notification message indicating that the leading vehicle gives up the authority for managing the vehicle group to the network side equipment; receiving, by the leading vehicle, a message sent from the network side equipment in response to the second notification message, the message indicates that the leading vehicle loses the management authority.

It is noted that the information interaction between the leading vehicle and members of the vehicle group and/or between the leading vehicle and the network side equipment in the embodiment is performed in one of the following manners: Point-to-Point (PTP) communication and Point-to-Multipoint (PTM) communication. The information interaction between the leading vehicle and members of the vehicle group and/or between the leading vehicle and the network side equipment described below is preferably performed in the manner described above.

Figure 5:
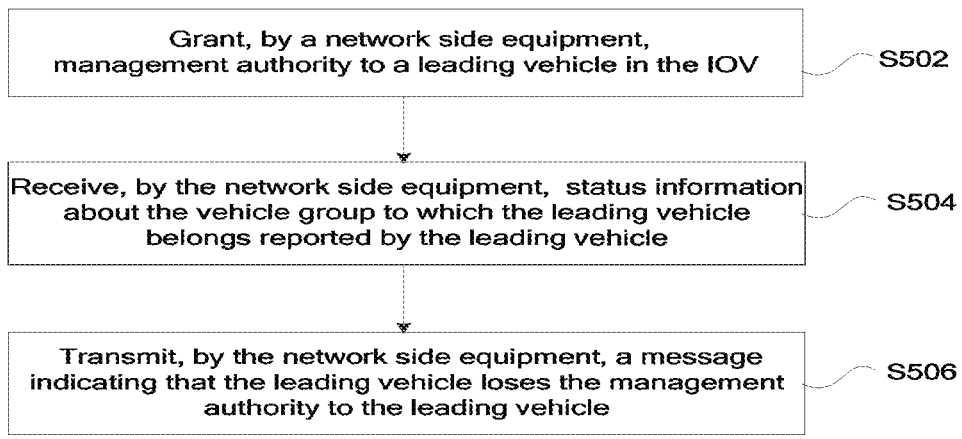
FIG. 5 is a second flowchart of a method for managing vehicles in the IOV according to an embodiment of the present disclosure.

FIG. 5 is a second flowchart of a method for managing vehicles in the IOV according to an embodiment of the present disclosure. As illustrated in FIG. 5, the method includes steps described below.

In step S502, a network side equipment grants management authority to a leading vehicle in the IOV.

The management authority is the authority of the leading vehicle for managing a vehicle group to which the leading vehicle belongs, and each vehicle group includes one or more vehicles.

In step S504, the network side equipment receives status information about the vehicle group, to which the leading vehicle belongs, reported by the leading vehicle.

Through this step, the network side equipment may learn the status information about the vehicle group, e.g., a traveling direction of the vehicle group, average traveling speed of the entire vehicle group, traveling speed of each member of the vehicle group and distance between members of the vehicle group.

In step S506, when the status information indicates that the leading vehicle decides to leave the vehicle group to which the leading vehicle belongs or the leading vehicle loses the management authority, the network side equipment transmits a message indicating that the leading vehicle loses the management authority to the vehicle group.

It can be seen from steps S502 to S506 described above, the network side equipment may grant management authority for managing the vehicle group to the leading vehicle in the IOV or revoke the management authority. After the leading vehicle has the management authority, the network side equipment then receives the status information about the vehicle group to which the leading vehicle belongs from the leading vehicle.

The above step S502 may be implemented in a manner described below.

In step S31, the network side equipment receives a request message for applying for the management authority transmitted from the leading vehicle.

The request message is carried with at least one of: identifiers of vehicles in the vehicle group to which the leading vehicle belongs, and communication resources. The communication resources may include: V2V communication resources, V2I communication resources and VOI communication resources.

In step S32, in response to the request message, the network side equipment transmits a response message to the leading vehicle. The response message is used for indicating that the management authority is granted to the leading vehicle.

In can be seen from steps S31 and S32 described above, when requiring management authority on the vehicle group, the leading vehicle may apply for the network side equipment to obtain the management authority.

In another optional implementation of the embodiment, after the network side equipment grants management authority to the leading vehicle in the IOV, the method of the present embodiment may further include steps describe below.

In step S1, when the leading vehicle decides to give up the management authority or leave the vehicle group, the network side equipment receives a second notification message transmitted from the network side equipment to indicate that the leading vehicle gives up the authority for managing the vehicle group.

In step S2, in response to the second notification message, the network side equipment transmits a message indicating that the leading vehicle loses the management authority to the leading vehicle.

The present embodiment further provides a device for managing vehicles in the IOV. The device is configured to implement embodiments and alternative implementations described above. Those described above will not be described here. The term "module" used hereafter may be a combination of software and/or hardware for achieving a predetermined function. While the device described in the embodiment below is preferably implemented in software, but implementations in hardware or a combination of software and hardware are also possible and contemplated.

Figure 6:
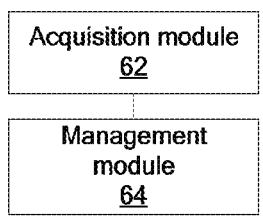
FIG. 6 is a first structure block diagram of a device for managing vehicles in the IOV according to an embodiment of the present disclosure.

FIG. 6 is a first structure block diagram of a device for managing vehicles in the IOV according to an embodiment of the present disclosure. The device is located at the leading vehicle of the IOV. As illustrated in FIG. 6, the device includes: an acquisition module 62 configured to acquire management authority from a network side equipment, where the management authority is the authority of the leading vehicle for managing a vehicle group to which the leading vehicle belongs, and each vehicle group includes a plurality of vehicles; a management module 64 coupled to the acquisition module 62 and configured to manage the vehicle group to which the leading vehicle belongs according to the management authority.

Figure 7:
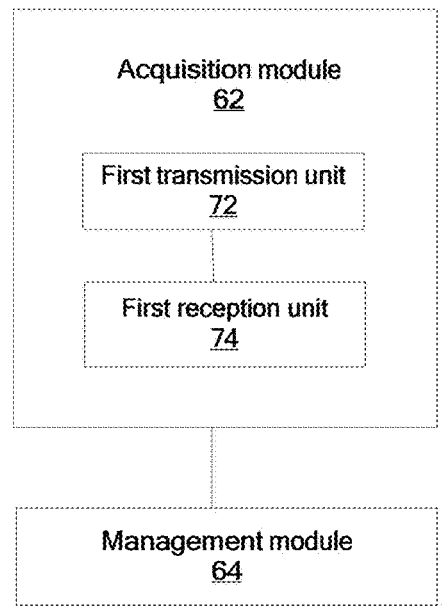
FIG. 7 is a first optional structure block diagram of a device for managing vehicles in IOV according to an embodiment of the present disclosure.

FIG. 7 is a first optional structure block diagram of a device for managing vehicles in the IOV according to an embodiment of the present disclosure. As illustrated in FIG. 7, the acquisition module 62 includes: a first transmission unit 72 configured to transmit a request message for applying for the management authority to the network side equipment; a first reception unit 74 coupled to the first transmission unit 72 and configured to receive a response message transmitted from the network side equipment in response to the request message, where the response message is used for indicating that the management authority is obtained by the leading vehicle.

A dedicated point-to-point connection, such as Radio Resource Control connection (RRC), is first established between the first transmission unit 72, the first reception unit 74 and the network side equipment. The leading vehicle transmits the request message for applying for the management authority to the network side equipment, then the network side equipment notifies the leading vehicle that the leading vehicle has obtained the management authority.

Optionally, the request message is carried with at least one of: identifiers of all the vehicles in the vehicle group to which the leading vehicle belongs, and communication resources.

Figure 8:
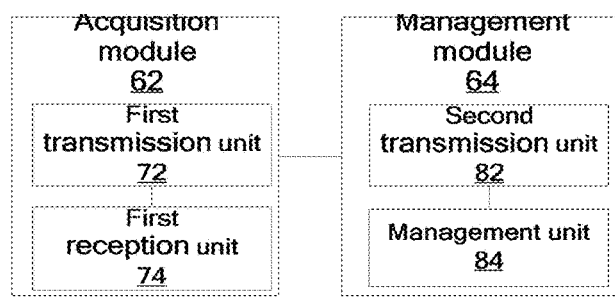
FIG. 8 is a second optional structure block diagram of a device for managing vehicles in the IOV according to an embodiment of the present disclosure.

FIG. 8 is a second optional structure block diagram of a device for managing vehicles in the IOV according to an embodiment of the present disclosure. As illustrated in FIG. 8, the management module 64 includes: a second transmission unit 82 configured to transmit a first notification message to members of the vehicle group, to which the leading vehicle belongs, other than the leading vehicle, where the first notification message is used for notifying the members other than the leading vehicle that the leading vehicle has obtained the management authority; a management unit 84 coupled to the second transmission unit 82. The management unit 84 is configured to perform a management operation on the members of the vehicle group after the leading vehicle receives a message for acknowledging the management authority transmitted from the members of the vehicle group other than the leading vehicle.

It is noted that the management operations on the members of the vehicle group in the alternative implementation of the present embodiment include at least one of: communication resource management, mobility management and connection management. In an alternative implementation of the present embodiment, the communication resource management may include communication resource allocation, communication resource scheduling and communication resource release. The communication resources may include V2V communication resource, V2I communication resources and IOV communication resources. The mobility management may include measurement of the distance between members of the vehicle group or speed thereof and handover between cells serving the vehicle group. The connection management may include connection establishment and connection release between members of the vehicle group. It is noted that the management operation described above are merely illustrative, and not intended to limit the present disclosure.

Figure 9:
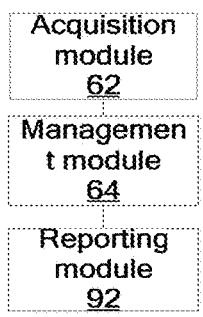
FIG. 9 is a third optional structure block diagram of a device for managing vehicles in the IOV according to an embodiment of the present disclosure.

FIG. 9 is a third optional structure block diagram of a device for managing vehicles in the IOV according to an embodiment of the present disclosure. As illustrated in FIG. 9, the device further includes a reporting module 92 coupled to the management module 64. The reporting module 92 is configured to, after the management module 64 manages the vehicle group to which the leading vehicle belongs according to the management authority, report status information about the vehicle group to which the leading vehicle belongs to the network side equipment. The status information may include: a traveling direction of the vehicle group, average traveling speed of the members of the vehicle group, distance between the members of vehicle groups and indication information for managing the vehicles in the vehicle group. The status information about the vehicle group is reported by the leading vehicle so that reporting status information with respect to each measurement under coverage of the network respectively is avoided. It is benefit for unified management of vehicles through reporting status information of the vehicles in the IOV by the leading vehicle.

Figure 10:
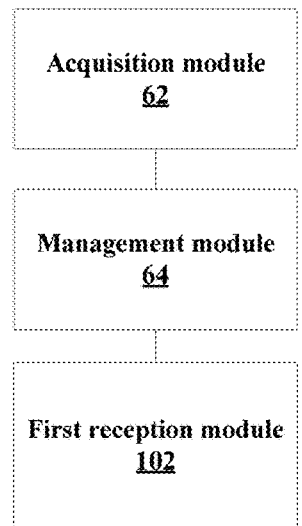
FIG. 10 is a fourth optional structure block diagram of a device for managing vehicles in the IOV according to an embodiment of the present disclosure.

FIG. 10 is a fourth optional structure block diagram of a device for managing vehicles in the IOV according to an embodiment of the present disclosure. As illustrated in FIG. 10, the device further includes a first reception module 102 coupled to the management module 64. The first reception module 102 is configured to, after the management module 64 manages the vehicle group to which the leading vehicle belongs according to the management authority, receive a message indicating that the leading vehicle loses the management authority transmitted from the network side equipment.

Figure 11:
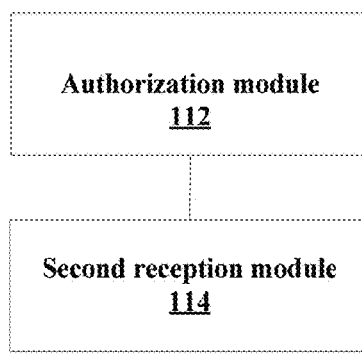
FIG. 11 is a second structure block diagram of a device for managing vehicles in the IOV according to an embodiment of the present disclosure.

Embodiments of the present disclosure further provide a device for managing vehicles in the IOV. FIG. 11 is a second structure block diagram of a device for managing vehicles in the IOV according to an embodiment of the present disclosure. The device is located at a network side equipment. As illustrated in FIG. 11, the device includes: an authorization module 112 configured to grant management authority to a leading vehicle in the IOV, where the management authority is the authority of the leading vehicle for managing a vehicle group to which the leading vehicle belongs, and each vehicle group includes a plurality of vehicles; a second reception module 114 coupled to the authorization module 112. The second reception module 114 is configured to, after the management authority is granted to the leading vehicle in the IOV by the authorization module, receive status information about the vehicle group to which the leading vehicle belongs reported by the leading vehicle.

Optionally, the authorization module 112 includes: a second reception unit configured to receive a request message for applying for the management authority transmitted from the leading vehicle; a third transmission unit configured to transmit, in response to the request message, a response message to the leading vehicle, where the response message is used for indicating that the management authority is granted to the leading vehicle. The request message is carried with at least one of: identifiers of all of the vehicles in the vehicle group to which the leading vehicle belongs, and communication resources.

Optionally, the device may further include a third reception module. The third reception module is configured to, when the leading vehicle decides to give up the management authority or leave the group, receive a second notification message indicating that the leading vehicle gives up the authority for managing the vehicle group transmitted from the leading vehicle; a transmitting module configured to, in response to the second notification message, transmit a message indicating that the leading vehicle has lost the management authority to the leading vehicle.

The present disclosure will be illustrated in combination with optional embodiments in the embodiment of the present disclosure.

The optional embodiment provides a method for controlling/managing a vehicle group. This optional embodiment primarily describes the followings in the case that a vehicle group is established: how a leading vehicle communicates with a network side equipment and how the leading vehicle controls each vehicle in the vehicle group, i.e., the network side equipment notifies the leading vehicle that the leading vehicle obtains/releases the control right over the vehicle group, which corresponds to the management authority in the embodiment described above, meanwhile the network releases/obtains the control right over the vehicle group. Then, the leading vehicle takes over/releases the control right over the vehicle group.

In the optional embodiment, it has numerous advantages that the leading vehicle takes over the control right over the vehicle group. For example, in the manner of the current IOV communication in the related art, when a plurality of vehicles are in the V2V communication, the V2V communication resource required by each vehicle is allocated by the network (under the coverage of the network) or previously allocated (outside the coverage of the network). In the case that the resource is allocated by the network, when the vehicles change cells frequently due to high speed movement, the V2V communication resource required by each vehicle may be allocated by different eNBs, which makes the communication resource frequently changes. In particular, the difficulty in allocation of resources will increase when the V2V communication resources required by different vehicles are allocated by different eNBs (the eNBs have to exchange information with each other to ensure that the V2V resources allocated to the vehicles do not collide). In the case that the resource is previously allocated, V2V communication resources required by the vehicles will lead to congestion.

In the optional embodiment, a unit bearing the IOV communication is also called On-Board Unit (OBU). In 3GPP, each vehicle may be regarded as a User Equipment (UE). Therefore, a vehicle group is a UE group, and the leading vehicle is a UE.

The V2V communication may be implemented using D2D technology defined by the 3GPP. In this case, the air interface between vehicles is PC5 interface defined by 3GPP D2D technology. The V2I communication may be implemented by means of the air interface between vehicles and network as defined by the 3GPP, e.g., Uu interface.

In the optional embodiment, the network side equipment may provide and allocate the IOV resources, and/or control and manage the IOV services, and/or provide wireless access to the IOV services.

Figure 12:
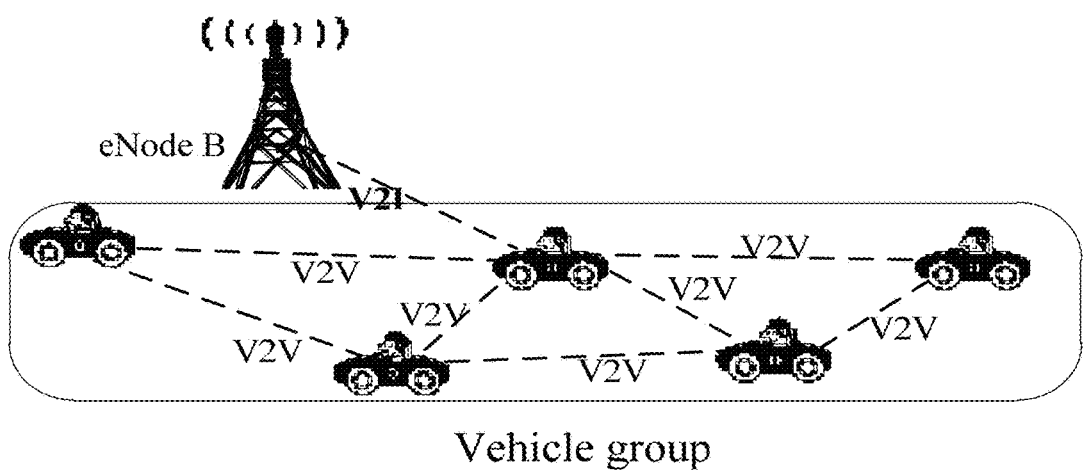
FIG. 12 is a schematic diagram of the management of a vehicle group according to an alternative embodiment of the present disclosure.

FIG. 12 is a schematic diagram of the management of a vehicle group according to an alternative embodiment of the present disclosure. As illustrated in FIG. 12, when the network side equipment is eNB, Relay or RSU having eNB function, the leading vehicle and the network side equipment communicate in the manner of V2I, i.e., through the Uu interface. The Uu interface is an interface between eNB and UE in 3GPP. When the network side equipment is a RSU having eNB function, the leading vehicle and the network side equipment communicate in the manner of V2V, i.e., through the PC5 interface, which is an interface between UEs in 3GPP D2D technology.

1. Communication Between the Leading Vehicle and the Network Side Equipment

The leading vehicle may acquire control right over the vehicle group and know the resources available to the vehicle group. The communication between the leading vehicle and the network refers to the dedicated point-to-point connection required to be established between the leading vehicle and the network. This dedicated connection may be implemented by means of the V2I communication and/or the V2V communication, i.e., through the Uu interface and/or the PC5 interface.

The control right of the leading vehicle over the vehicle group includes: resource management (e.g., resource allocation, resource scheduling and resource release), mobility management (e.g., measurement, cell handover) and connection management (e.g., connection establishment and connection release) and the like. One or more processes included are described below.

Process 1: the leading vehicle acquires the control right over the vehicle group Specifically, the network side equipment notifies the leading vehicle that the leading vehicle has obtained the control right over the vehicle group. Further, the network side equipment may also notify the leading vehicle of information related to the vehicle group, such that the leading vehicle learns resources available to the leading vehicle (i.e., the total resources which are allocated to all the vehicles in the vehicle group and can be used by the vehicles). Then, the leading vehicle is able to further allocate a resource from the resources to each vehicle in the vehicle group.

The information notified to the leading vehicle by the network side equipment includes one or more of the followings: (1) whether the leading vehicle is permitted to control the vehicle group, i.e., whether the leading vehicle is permitted to control the resource allocation and resource scheduling of the vehicle group; (2) if the leading vehicle is permitted to control the vehicle group, the information may also include resource information of resources allocated to the vehicle group, e.g., frequency point information, time slot information, modulation code.

Process 2: the leading vehicle reports information (status information) of the vehicle group Specifically, the leading vehicle frequently reports information related to the vehicle group to the network side equipment. The vehicle group may report to the network side equipment (e.g., periodically or triggered by events) initiatively. Alternatively, the leading vehicle may report after receiving an indication from the network side equipment.

Process 3: the leading vehicle releases the control right over the vehicle group Specifically, the network side equipment notifies the leading vehicle that the leading vehicle no longer has the control right over the vehicle group (at this time, the vehicle group is controlled by the network side equipment). Moreover, the network side equipment may also notify the leading vehicle of information related to the vehicle group.

The processes described above will be described in detail in combination with accompanying drawings.

Figure 13:
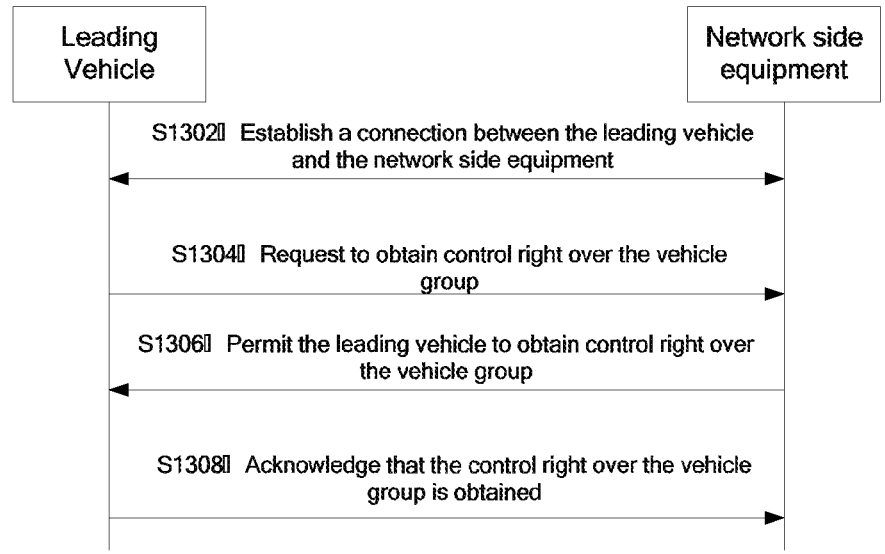
FIG. 13 is a flowchart of a method for acquiring control right over a vehicle group according to an embodiment of the present disclosure.

FIG. 13 is a flowchart of a method for acquiring the control right over a vehicle group according to an embodiment of the present disclosure. As illustrated in FIG. 13, the method includes steps described below.

In step S1302, a dedicated point-to-point connection (RRC connection) needs to be established between a leading vehicle and a network side equipment.

The RRC connection may be established before the communication between the leading vehicle and the network side equipment.

In step S1304, the leading vehicle transmits a request message for applying for control right over the vehicle group to the network side equipment.

The request message includes one or more of the following information: information about the leading vehicle (e.g., ID of the leading vehicle), information about members of the vehicle group (e.g., user IDs), information about resources necessary for communications (e.g., the V2V communication resource, the V2I communication resource, or the IOV communication resource).

In step S1306, the network side equipment instructs the leading vehicle that the leading vehicle has obtained the control right over the vehicle group.

In step S1308, the leading vehicle transmits an acknowledgement message to the network side equipment.

Figure 14:
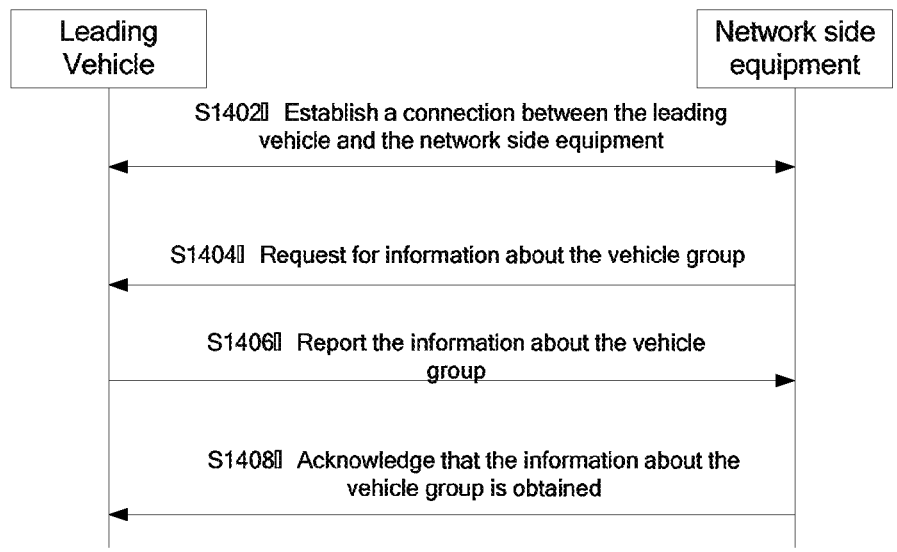
FIG. 14 is a flowchart of a method for reporting a status of a vehicle group to a network side equipment according to an embodiment of the present disclosure.

FIG. 14 is a flowchart of a method for reporting a status of a vehicle group to a network side equipment according to an embodiment of the present disclosure. As illustrated in FIG. 14, the method includes steps described below.

In step S1402, a dedicated point-to-point connection (RRC connection) needs to be established between a leading vehicle and a network side equipment.

The RRC connection may be established before the communication between the leading vehicle and network side equipment.

In step S1404, the network side equipment requests the leading vehicle for information about the vehicle group.

The information about the vehicle group may be status information of all the vehicles in the vehicle group or status information of part of vehicles in the vehicle group.

In step S1406, the leading vehicle reports information about the vehicle group to the network side equipment.

In step S1408, the network side equipment transmits an acknowledgement message to the leading vehicle.

Figure 15:
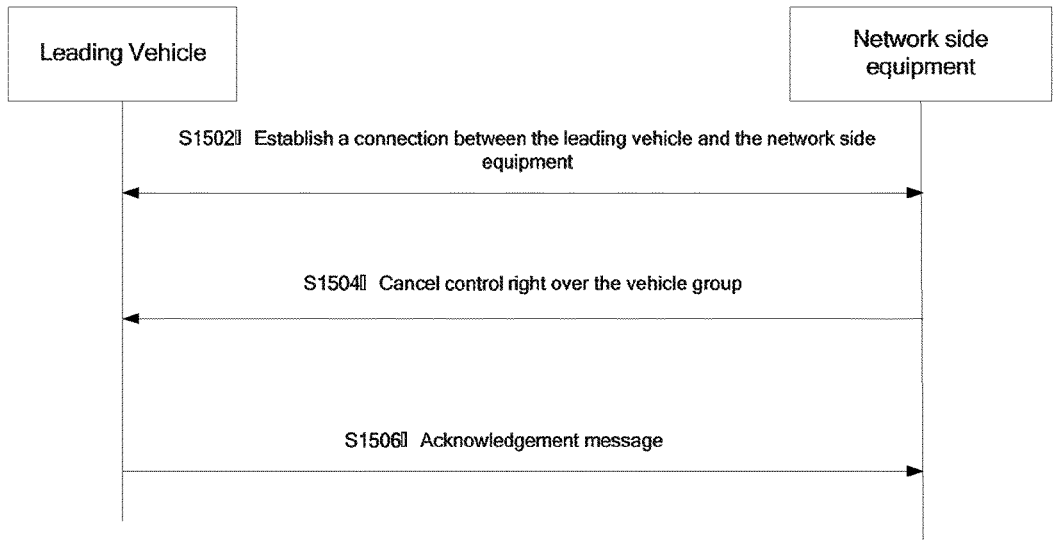
FIG. 15 is a flowchart of a method for revoking, by a network side equipment, the control right over a vehicle group from a leading vehicle according to an embodiment of the present disclosure.

FIG. 15 is a flowchart of a method for revoking, by a network side equipment, control right over a vehicle group from a leading vehicle according to an embodiment of the present disclosure. As illustrated in FIG. 15, the method includes steps described below.

In step S1502, a dedicated point-to-point connection (e.g., RRC connection) needs to be established between a leading vehicle and a network side equipment.

In step S1504, the network side equipment transmits a message to the leading vehicle to cancel the leading vehicle's control right over the vehicle group.

In step S1506, the leading vehicle transmits an acknowledgement message to the network side equipment.

2. Communication Between Members of the Vehicle Group and the Network

The members of the vehicle group may learn that the following V2V communication is controlled by the network side equipment or the leading vehicle. Since a vehicle group includes a plurality of members, the communication between members of the vehicle group and the network side equipment may be implemented by means of a dedicated point-to-point (PTP) connection or point-to-multipoint (PTM) broadcasting. The communication between a member of vehicle group and the network may be implemented in a process described below.

Process 4: the communication between the member of the vehicle group and the network may be implemented through the V2I communication and/or the V2V communication. In the PTP mode, a dedicated PTP connection (e.g., RRC connection) needs to be established between the member of the vehicle group and the network. However, if the RRC connection has been established prior to the communication between the member of the vehicle group and the network, this process is unnecessary. In the PTM mode, this process is also unnecessary. Then, the network side equipment notifies the member of the vehicle group that the leading vehicle has obtained/released the control right over the vehicle group, and may notify of information about the leading vehicle and information about the vehicle group. After the member of the vehicle group learns that the leading vehicle has obtained the control right over the vehicle group, the member of the vehicle group communicates with the leading vehicle through the V2V and acquires resource for the V2V communication from the vehicle group when the member of the vehicle group needs related IOV services or applications. After the member of the vehicle group learns that the leading vehicle has lost the control right over the vehicle group, the member of the vehicle group communicates with the network and acquires resource for the V2V communication from the network when the member of the vehicle group needs related IOV services or applications. In addition to the manners described above, the member of the vehicle group transmits an acknowledgement message finally, which may be implemented in the PTM mode.

3. Method for Controlling a Vehicle Group by a Leading Vehicle

The leading vehicle controls the vehicle group through the V2V communication. The method includes one or more of the following processes: (1) the leading vehicle notifies members of the vehicle group that the leading vehicle has obtained/lost the control right over the vehicle group; (2) the leading vehicle allocates resources to the vehicles in the vehicle group.

Since a vehicle group includes merely one leading vehicle and a plurality of members, the V2V communication between the leading vehicle and the members of the vehicle group may utilize the PTP connection or PTM connection. When the V2V communication utilizes the D2D technology defined in the 3GPP, the communication between the leading vehicle and a member of the vehicle group may be implemented in the manner of D2D unicast/multicast. Specifically, the process described above may be implemented by the processes between vehicles described below.

Process 5: the communication between vehicles as well as the communication between the leading vehicle and the vehicle group Specifically, the leading vehicle notifies the member of the vehicle group that the leading vehicle has obtained the control right over the vehicle group. First, the leading vehicle transmits a notification message to the member of the vehicle group to notify that the leading vehicle has obtained the control right over the vehicle group; then the member of the vehicle group transmits an acknowledgement message to the leading vehicle.

Process 6: the communication between vehicles as well as the communication between the leading vehicle and the vehicle group Specifically, the leading vehicle allocates resources to the members of the vehicle group. First, a member of the vehicle group applies to the leading vehicle for a V2V communication resource which include frequency point, time slot, service time, etc. Then the leading vehicle agrees or refuses to allocate the V2V communication resource to the member of the vehicle group. Finally, the member of the vehicle group transmits an acknowledgement message to the leading vehicle.

Process 7: the communication between vehicles as well as the communication between the leading vehicle and the vehicle group Specifically, the vehicle recovers the resource previously allocated. First, the leading vehicle transmits a request message for recovering the resource previously allocated to a member of the vehicle group. Then, the member of the vehicle group transmits an acknowledgement message to the leading vehicle. The member of the vehicle group no longer uses the resource previously allocated.

The optional embodiment will be described in detail using the embodiment of the optional embodiment in a specific application scenario. In this embodiment, the network side equipment is an eNB, and the leading vehicle is a UE. The vehicle group consists of a plurality of vehicles (e.g., a plurality of UEs), thus the vehicle group is a UE group. The communication between the network and the leading vehicle is the V2I communication. The communication between the network and the members of the vehicle group is the V2I communication and utilizes single-cell Point-to-Point (SC-PTM) transmission.

Figure 16:
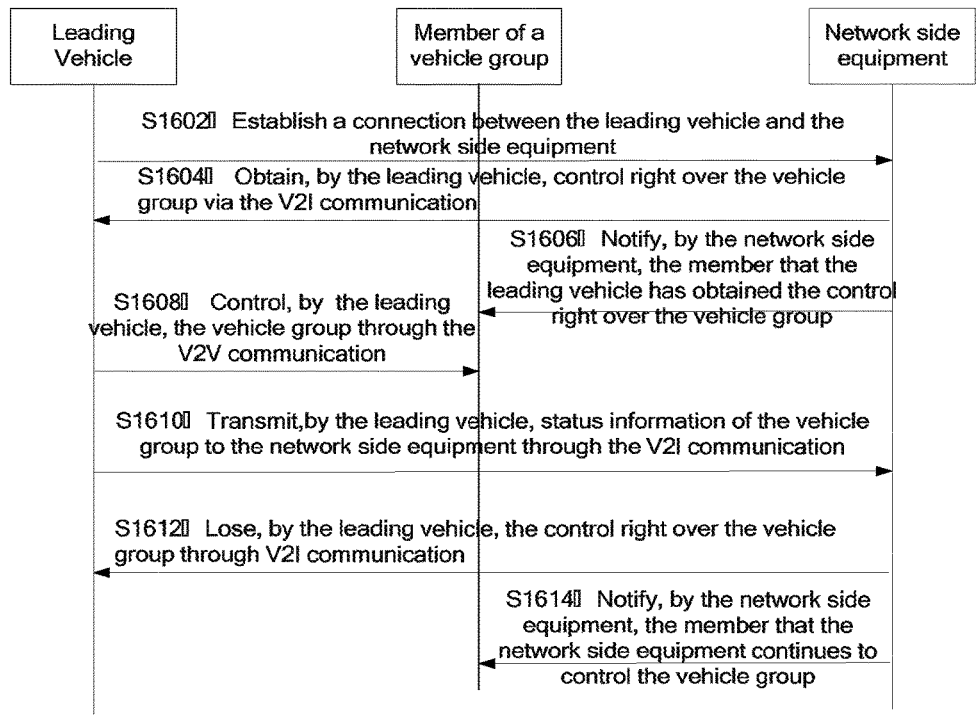
FIG. 16 is a flowchart of a method for authorizing, by a network side equipment, a leading vehicle to allocate resources to members of the vehicle group according to an alternative embodiment of the present disclosure.

FIG. 16 is a flowchart of a method for authorizing, by a network side equipment, a leading vehicle to allocate resources to members of the vehicle group according to an alternative embodiment of the present disclosure. As illustrated in FIG. 16, the method includes steps described below.

In step S1602, a dedicated RRC connection is established between the network side equipment and the leading vehicle.

In step S1604, a PTP bearing is established between the network side equipment and the leading vehicle. Through the V2I communication, the network side equipment grants the control right over the vehicle group to the leading vehicle, and notifies the leading vehicle of information about members of the vehicle group and available resources.

In step S1606, a SC-PTM bearing is established between the network side equipment and the leading vehicle. Through the V2I communication, the members of the vehicle group are notified that the leading vehicle has the control right over the vehicle group including information about the leading vehicle.

In step S1608, the leading vehicle communicates with the members of the vehicle group through unicast/multicast D2D technology. The leading vehicle allocates and schedules resources for the members of the vehicle group through the V2V communication.

In step S1610, a PTP bearing is established between the network side equipment and the leading vehicle, and the leading vehicle reports status information about the vehicle group to the network side equipment through the V2I communication.

In step S1612, a PTP bearing is established between the network side equipment and the leading vehicle, and the network side equipment revokes the control right over the vehicle group from the leading vehicle through the V2I communication.

In step S1614, a SC-PTM bearing is established between the network side equipment and the leading vehicle, the network side equipment notifies the members of the vehicle group that the leading vehicle has lost the control over the vehicle group, and the network side equipment controls the IOV communication of the members of the vehicle group.

In another embodiment, a software for implementing the embodiments and optional implementations as described above is provided.

In another embodiment, a storage medium is provided, on which the above software is stored. The storage medium includes, but not limited to, CD-ROM, floppy disk, hard disk, EPROM and the like.

Those skilled in the art should understand that modules or steps of the present disclosure described above may be implemented by means of universal computing devices, which may be integrated in a single computing device or distributed among a network consisting of multiple computing devices. Optionally, the modules or steps may be implemented by program codes which are executable by a computing device; hence, the program codes may be stored in a storage device and executed by a computing device. In some cases, the illustrated or described steps may be performed in an order different from that described herein; the modules or steps may be embodied by respective integrated circuit modules, or some of them may be embodied by a single integrated circuit module. The present disclosure is not limited to any specific combination of hardware and software.

The above description is merely optional embodiments of the present disclosure and not intended to limit the present disclosure. For those skilled in the art, the present disclosure may have various modifications and alterations. All of the modifications, equivalents and improvements within the scope and principle of the present disclosure are intended to fall within the scope of the present disclosure.

INDUSTRIAL APPLICABILITY

In embodiments of the present disclosure, vehicles in the IOV are grouped and the leading vehicle of a vehicle group acquires authority for managing the vehicle group to which the leading vehicle belongs from a network side equipment, which enables the vehicles in the vehicle group to be managed. The embodiments of the disclosure no longer need the network side equipment to manage the vehicles in the IOV respectively, and it is only required that one vehicle in the vehicle group obtains the management authority and becomes the leading vehicle to manage the vehicles in the vehicle group. Therefore, the following problem in related art is solved, thereby improving the efficiency in managing vehicles in the IOV: the network side equipment fails to allocate and release resources for vehicles in the IOV timely.

What is claimed is:

1. A method for managing vehicles in Internet of Vehicles (IOV), comprising:
   acquiring, by a leading vehicle in the IOV, management authority from a network side equipment, wherein the management authority is authority of the leading vehicle for managing a vehicle group to which the leading vehicle belongs, the vehicle group comprising a plurality of vehicles; and
   managing, by the leading vehicle, the vehicle group to which the leading vehicle belongs according to the management authority;
   wherein the managing, by the leading vehicle, the vehicle group to which the leading vehicle belongs according to the management authority comprises:
      transmitting, by the leading vehicle, a first notification message to the plurality of vehicles of the vehicle group to which the leading vehicle belongs other than the leading vehicle, wherein the first notification message is used for notifying the plurality of vehicles of the vehicle group other than the leading vehicle that the management authority is obtained by the leading vehicle; and
      performing, by the leading vehicle, a management operation on the vehicle group after receiving a message which is transmitted from the plurality of vehicles of the vehicle group other than the leading vehicle in response to the first notification message and used for acknowledging the management authority.

2. The method according to claim 1, wherein acquiring, by the leading vehicle in the IOV, the management authority from the network side equipment comprises:
   transmitting, by the leading vehicle, a request message for applying for the management authority to the network side equipment; and
   receiving, by the leading vehicle, a response message transmitted from the network side equipment in response to the request message, wherein the response message is used for indicating that the management authority is obtained by the leading vehicle.

3. The method according to claim 2, wherein the request message includes at least one of: identifiers of all the vehicles in the vehicle group to which the leading vehicle belongs, or communication resources.

4. The method according to claim 1, wherein the management operation on the plurality of vehicles of the vehicle group comprises at least one of: communication resource management, mobility management or connection management.

5. The method according to claim 1, wherein the method further comprises, after the managing, by the leading vehicle, the vehicle group to which the leading vehicle belongs according to the management authority:
   reporting, by the leading vehicle, status information about the vehicle group to which the leading vehicle belongs to the network side equipment.

6. The method according to claim 1, wherein the method further comprises, after managing, by the leading vehicle, the vehicle group to which the leading vehicle belongs according to the management authority:
   when the leading vehicle has lost the management authority or leaves the vehicle group, transmitting, by the leading vehicle, a second notification message indicating that the leading vehicle has lost the management authority for managing the vehicle group to the network side equipment; and
   receiving, by the leading vehicle, a message transmitted from the network side equipment in response to the second notification message, wherein the message indicates that the leading vehicle has lost the management authority.

7. The method according to claim 1, wherein information interaction between the leading vehicle and the plurality of vehicles of the vehicle group other than the leading vehicle and/or information interaction between the leading vehicle and the network side equipment is performed using at least one of: Point-to-Point (PTP) communication or Point-to-Multipoint (PTM) communication.

8. The method according to claim 1, wherein the network side equipment comprises at least one of: an evolved Node B (eNB), a Relay, or a Radio Side Unit (RSU).

9. A method for managing vehicles in Internet of Vehicles (IOV), comprising:
   granting, by a network side equipment, management authority to a leading vehicle in the IOV, wherein the management authority includes authority of the leading vehicle for managing a vehicle group to which the leading vehicle belongs, and the vehicle group comprises a plurality of vehicles;
   when the leading vehicle has lost the management authority or leaves the vehicle group, receiving, by the network side equipment, a second notification message indicating that the leading vehicle has lost the management authority for managing the vehicle group transmitted from the leading vehicle; and
   transmitting, by the network side equipment, a response message to the leading vehicle in response to the second notification message, wherein the response message is used for indicating that the leading vehicle has lost the management authority.

10. The method according to claim 9, wherein granting, by the network side equipment, the management authority to the leading vehicle in the IOV comprises:
    receiving, by the network side equipment, a request message for applying for the management authority transmitted from the leading vehicle; and
    transmitting, by the network side equipment, a response message to the leading vehicle in response to the request message, wherein the response message is used for indicating that the management authority is granted to the leading vehicle.

11. The method according to claim 10, wherein the request message includes at least one of: identifiers of the plurality of vehicles in the vehicle group to which the leading vehicle belongs, or communication resources.

12. The method according to claim 9, wherein the method further comprises, after granting, by flail the network side equipment, management authority to the leading vehicle in the IOV:

receiving, by the network side equipment, status information about the vehicle group to which the leading vehicle belongs, wherein the status information is reported by the leading vehicle.

13. A device for managing vehicles in Internet of Vehicles (IOV), wherein the device is configured to be applied to a leading vehicle of the IOV and comprises a processor and a storage device for storing computer executable instructions that when executed by the processor cause the processor to perform:

acquiring management authority from a network side equipment, wherein the management authority is authority of the leading vehicle for managing a vehicle group to which the leading vehicle belongs, and the vehicle group comprises a plurality of vehicles; and managing the vehicle group to which the leading vehicle belongs according to the management authority, comprising:

transmitting a notification message to the plurality of vehicles of the vehicle group, to which the leading vehicle belongs, other than the leading vehicle, wherein the notification message is used for notifying the plurality of vehicles of the vehicle group other than the leading vehicle that the management authority is obtained by the leading vehicle; and performing a management operation on the vehicles of the vehicle group after the leading vehicle receives a message for acknowledging the management authority transmitted from the vehicles of the vehicle group other than the leading vehicle.

14. The device according to claim 13, wherein the computer executable instructions when executed by the processor cause the processor to further perform:

transmitting a request message for applying for the management authority to the network side equipment; and receiving a response message transmitted from the network side equipment in response to the request message, wherein the response message is used for indicating that the management authority is obtained by the leading vehicle.

15. The device according to claim 14, wherein the request message includes at least one of: identifiers of the plurality of vehicles in the vehicle group to which the leading vehicle belongs, or communication resources.

16. A device for managing the vehicles in Internet of Vehicles (IOV), wherein the device is configured to be applied to a network side equipment and comprises a processor and a storage device for storing computer executable instructions that when executed by the processor cause the processor to perform the method according to claim 10.

17. The device according to claim 16, wherein the computer executable instructions when executed by the processor cause the processor to further perform:

receiving a request message for applying for the management authority transmitted from the leading vehicle; and transmitting a response message to the leading vehicle in response to the request message, wherein the response message is used for indicating that the management authority is granted to the leading vehicle.

* * * * *